US006879162B2

(12) United States Patent
Aguero et al.

(10) Patent No.: US 6,879,162 B2
(45) Date of Patent: Apr. 12, 2005

(54) SYSTEM AND METHOD OF MICRO-FLUIDIC HANDLING AND DISPENSING USING MICRO-NOZZLE STRUCTURES

(75) Inventors: Victor M. Aguero, Menlo Park, CA (US); Elizabeth J. Brackmann, Portola Valley, CA (US); Jose P. Joseph, Palo Alto, CA (US); Christopher E. Holland, San Carlos, CA (US); Charles A. Spindt, Menlo Park, CA (US); Paul R. Schwoebel, Basque Farms, NM (US); Eric M. Pearson, Redwood City, CA (US)

(73) Assignee: SRI International, Menlo Park, CA (US)

( * ) Notice: Subject to any disclaimer, the term of this patent is extended or adjusted under 35 U.S.C. 154(b) by 62 days.

(21) Appl. No.: 10/285,396

(22) Filed: Oct. 31, 2002

(65) Prior Publication Data

US 2003/0146757 A1 Aug. 7, 2003

Related U.S. Application Data

(63) Continuation-in-part of application No. 09/707,779, filed on Nov. 7, 2000, now Pat. No. 6,577,130.
(60) Provisional application No. 60/335,194, filed on Oct. 31, 2001.

(51) Int. Cl.[7] .......................... G01N 27/60; H01J 49/00
(52) U.S. Cl. ....................................... 324/453; 250/288
(58) Field of Search ................................ 324/464, 348, 324/357, 452, 453; 250/288; 315/169.3

(56) References Cited

U.S. PATENT DOCUMENTS

| | | | | |
|---|---|---|---|---|
| 4,926,056 A | | 5/1990 | Spindt | |
| 5,223,226 A | | 6/1993 | Wittmer et al. | |
| 5,331,159 A | | 7/1994 | Apffel, Jr. et al. | |
| 5,423,964 A | | 6/1995 | Smith et al. | |
| 5,486,337 A | | 1/1996 | Ohkawa | |
| 5,541,473 A | | 7/1996 | Duboc, Jr. et al. | |
| 5,872,010 A | | 2/1999 | Karger et al. | |
| 5,994,696 A | | 11/1999 | Tai et al. | |
| 6,043,487 A | | 3/2000 | Waki | |
| 6,114,693 A | | 9/2000 | Hirabayashi et al. | |
| 6,140,640 A | | 10/2000 | Wittmer et al. | |
| 6,224,193 B1 | * | 5/2001 | Minemoto et al. | 347/55 |
| 6,245,227 B1 | | 6/2001 | Moon et al. | |
| 6,362,574 B1 | | 3/2002 | Aguero et al. | |
| 6,394,942 B1 | | 5/2002 | Moon et al. | |
| 6,454,938 B1 | | 9/2002 | Moon et al. | |
| 6,459,206 B1 | | 10/2002 | Aguero et al. | |
| 2002/0043463 A1 | * | 4/2002 | Shenderov | 204/450 |
| 2002/0053652 A1 | * | 5/2002 | Freisinger et al. | 251/30.03 |
| 2002/0101170 A1 | * | 8/2002 | Dunphy et al. | 315/169.3 |
| 2003/0049177 A1 | * | 3/2003 | Smith et al. | 422/100 |

OTHER PUBLICATIONS

Gaskell, "Electrospray: Principles and Practice," Journal of Mass Spectrometry, Vo.. 32, 677–688 (1997).
Brodie et al., "Vacuum Microelectronics Devices," Proceedings of the IEEE, vol. 82, No. 7, Jul. 1994.

* cited by examiner

*Primary Examiner*—N. Le
*Assistant Examiner*—Amy He
(74) *Attorney, Agent, or Firm*—Guerin & Rodriguez, LLP; Michael A. Rodriguez

(57) ABSTRACT

Described are a method and system for dispensing a fluid. A fluid-dispensing device includes a substrate and a plurality of nozzles formed in the substrate. Each nozzle has an open-ended tip and a fluid-conducting channel between the tip and a source of fluid. A non-conducting spacer is on the substrate and electrically isolates a gate electrode from the substrate. The gate electrode is located adjacent to the tip of at least one of the nozzles to effect dispensing of the fluid in that nozzle in response to a voltage applied between the gate electrode and the nozzle or fluid in the nozzle. In one embodiment, the gate electrode includes a plurality of individually addressable gate electrodes used for selectively actuating nozzles.

68 Claims, 7 Drawing Sheets

SYSTEM AND METHOD OF MICRO-FLUIDIC HANDLING AND DISPENSING USING MICRO-NOZZLE STRUCTURES

RELATED APPLICATIONS

This application is a continuation-in-part application claiming priority to U.S. patent application Ser. No. 09/707,779, filed Nov. 7, 2000 now U.S. Pat. No. 6,577,130, titled "A System and Method for Sensing and Controlling Potential Differences between a Space Object and Its Space Plasma Environment using Micro-Fabricated Field Emission Devices," the entirety of which application is incorporated by reference herein. This application also claims the benefit of the filing date of U.S. Provisional Application, Ser. No. 60/335,194, filed Oct. 31, 2001 now abandoned, titled "Micro-fluidic Handling System using Micro-nozzle Structures—Apparatus and Methods of Use," the entirety of which provisional application is incorporated by reference herein.

FIELD OF THE INVENTION

The invention relates generally to systems and methods of handling and dispensing small volumes of fluid. More particularly, the invention relates to micro-fabricated devices for handling and dispensing pico-liter and sub-picoliter volumes of fluid, and to methods of using such devices.

BACKGROUND

Many current chemical and biochemical analyses, for example, analyzing the chemical constitution of a substance, monitoring the progress of chemical and biochemical reactions, and determining the presence of trace components of biological fluids, require the sampling of solutions. Often, such analyses require the use of minute volumes of samples and reagents. Current techniques dispense such volumes as micro-droplets, often placing many such micro-droplets in close proximity to each other in an array on the surface of, or inside of, a substrate or well, such as a slide, micro-card, chip, or membrane. High-density arrays (or micro-arrays) enable many reactions to occur in parallel fashion.

Handling and dispensing fluid in femto-liter ($10^{-15}$) volumes, however, requires appropriately sized structures and control systems. Also, these structures and control systems should be electronically controllable because of the precision needed to properly handle such small fluid volumes.

One type of device developed for dispensing small quantities of fluid is referred to as an electro-spray device. In general, electro-spray devices use electrostatics to draw fluid from a capillary opening of the electro-spray device to an extracting electrode positioned nearby. The extracting electrode is typically an instrument or an electrode at the entry to an instrument (e.g., a mass spectrometer), separate from the electro-spray device, that samples the fluid drawn from the capillary. The instrument is placed within a few millimeters of the electro-spray device and electrically charged so as to function as the collector of the fluid and as the source of the electrical potential that produces a high electric field and induces the fluid to leave the electro-spray device.

More specifically, an electrical potential difference is applied between the extracting electrode and a conductive or partly conductive fluid in the capillary of the electro-spray device. The electrical potential difference generates an electric field that is concentrated at the end of the capillary.

Electric field lines emanate from the end of the capillary and extend toward the extracting electrode. A volume of the fluid in the capillary is pulled from the end of the capillary into the shape of a cone, known as a Taylor cone. Droplets form at the tip of the Taylor cone and are drawn to the extracting electrode.

The magnitude of the electrical potential difference required to induce electro-spray depends upon the surface tension of the fluid in the capillary, a diameter of the capillary, and the distance of the capillary from the extracting electrode. Typically, the needed electric field is on the order of approximately $10^6$ V/m.

A disadvantage common to many implementations of electro-spray devices is the high voltages needed to produce the electric field that achieves electro-spray. For some electro-spray devices, these voltages range from 500 volts to several kilovolts. Such high voltages can cause arcing between the capillary and the extracting electrode, causing the ongoing analysis to fail and posing a risk of damage to the electro-spray device and the sampling instrument. Moreover, some electro-spray devices have multiple capillaries for producing electro-spray, but the high voltages prevent independent operation of individual capillaries because the electric field generated at one capillary interferes with its neighboring capillaries. The high voltages also set a lower limit for the volume of fluid that can flow. Current fluid transfer capabilities are in the nano-liter to pico-liter range, but cannot achieve volumes in the femto-liter range.

Thus, there remains a need for a system and method for handling and dispensing minute volumes of fluid in the femto-liter range that can operate at voltages lower than the current electro-spray devices described above.

SUMMARY

In one aspect, the invention features a fluid-dispensing device comprising a substrate and a plurality of nozzles formed in the substrate. Each nozzle has an open-ended tip and a fluid-conducting channel between the tip and a source of fluid. A non-conducting spacer is on the substrate and a gate electrode is electrically isolated from the substrate by the non-conducting spacer. The gate electrode is located adjacent to the tip of at least one of the nozzles to effect dispensing of fluid from the at least one nozzle in response to a voltage applied to the gate electrode.

In another aspect, the invention features a fluid-dispensing device comprising a substrate and a nozzle formed in the substrate. The nozzle has an open-ended tip and a fluid-conducting channel between the tip and a source of fluid. A non-conducting spacer is on the substrate. The non-conducting spacer electrically isolates a gate electrode from the substrate. The gate electrode is located adjacent to the tip of the nozzle to effect dispensing of fluid in the nozzle in response to a voltage applied to the gate electrode.

In yet another aspect, the invention features a fluid-dispensing device comprising a substrate and a plurality of nozzles formed in the substrate. Each nozzle has an open-ended tip and a fluid-conducting channel between the tip and a source of fluid. The device also includes a plurality of individually addressable gate electrodes that are supported by the substrate. Each individually addressable gate electrode is located adjacent to at least one of the nozzles to effect an ion to leave the tip of that at least one nozzle in response to a voltage applied to that individually addressable gate electrode.

The invention also features an apparatus comprising a source of fluid, a fluid-dispensing device micro-fabricated on a substrate, and a voltage source. The fluid-dispensing device has a nozzle and a gate electrode. The nozzle has an open-ended tip and a fluid-conducting channel between the tip and the source of fluid. The channel obtains fluid from the source of fluid. The gate electrode is electrically isolated from the substrate and is located adjacent to the tip of the nozzle to effect dispensing of fluid from the nozzle in response to a voltage applied to the gate electrode by the voltage source.

Also, in yet another aspect, the invention features a method for mixing fluids using a fluid-dispensing device having a plurality of nozzles and a plurality of individually addressable gate electrodes. Each nozzle has an open-ended tip and a fluid-conducting channel between the tip and a source of fluid. Each individually addressable gate electrode is located adjacent to the tip of at least one of the plurality of nozzles to effect dispensing of fluid from that tip when a voltage is applied to that individually addressable gate electrode. A receptacle is aligned with the fluid-dispensing device to receive fluid dispensed from a first and second nozzle of the plurality of nozzles. A first voltage is applied to a first individually addressable gate electrode to effect dispensing a first fluid at a first flow rate from the first nozzle into the receptacle. A second voltage is applied to a second individually addressable gate electrode to effect dispensing a second fluid at a second flow rate from the second nozzle into the receptacle so that the second fluid can mix with the first fluid.

The invention also features a method of dispensing fluid by a fluid-dispensing device having a plurality of nozzles and a plurality of individually addressable gate electrodes. Each nozzle has an open-ended tip and a fluid-conducting channel between the tip and a source of fluid. Each individually addressable gate electrode is located adjacent to the tip of at least one of the plurality of nozzles to effect dispensing of fluid from that tip when a voltage is applied to that individually addressable gate electrode. The method comprises selecting one of the individually addressable gate electrodes for applying a voltage thereto and applying the voltage to the selected individually addressable gate electrode to effect dispensing fluid from at least one of the nozzles while other nozzles of the fluid-dispensing device remain inactivated.

BRIEF DESCRIPTION OF THE DRAWINGS

The invention is pointed out with particularity in the appended claims. The advantages of the invention described above, as well as further advantages of this invention may be better understood by reference to the following description taken in conjunction with the accompanying drawings, in which:

DETAILED DESCRIPTION

Gated charge emission devices of the present invention are useful in a variety of applications. In brief overview, gated charge emission devices are micro-fabricated devices that have an integrated gate (or gate electrode) and an emitter from which electrons or ions are emitted. "Integrated" as used herein means that the gate electrode is part of the micro-fabricated structure that includes the emitter, and "micro-fabricated" as used herein means that the devices are made by fabrication techniques of the type used to make integrated circuitry. A voltage applied between the gate electrode and the emitter induces electrons or ions to leave the emitter. For embodiments of gated charge emission devices that operate with a fluid (referred to as fluid-dispensing devices), the applied voltage induces the emitter (or micro-nozzle) to dispense minute volumes of the fluid.

The handling and dispensing of minute volumes of fluids has practical application in a wide range of industries and systems including, but not limited to, micro-fluidic sampling and delivery systems for medical diagnostics and treatment, biological research, mass spectrometry, aerosol drug delivery (i.e., nebulizers or inhalers which turn a liquid into a droplet mist), fluid and food processing, semiconductor analysis and processing, chemical processing, printing, and general fluid control. Further, the fluid-dispensing device of the present invention can be used in electro-spray applications as a substitute for the electro-spray capillary used in mass spectrometry, to improve the precision and selectivity of fluid dispensing as described in more detail below. Control of fluid movement by means of the fluid-dispensing device of the present invention can also be used for achieving other functions such as surface property modification and modulation, data storage, and implementing computational and control systems. Space-based applications are another type of application in which to employ fluid-dispensing devices of the present invention, for example, as ion or fluid thrusters for propelling a space object through a space plasma environment. This list of application examples described above is not intended to be exhaustive.

Figure 1:
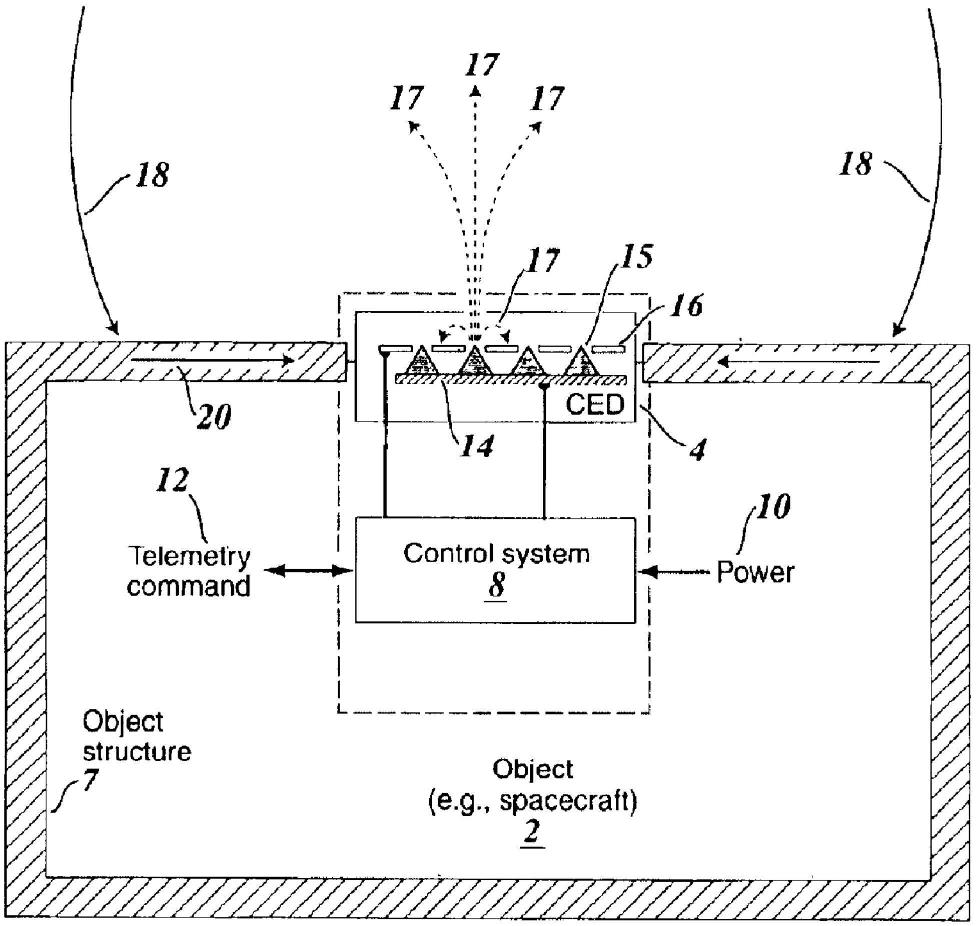
FIG. 1 is a diagram of an embodiment of a system for measuring and controlling the electrical potential difference between an object and the ambient space plasma environment, the system including a charge-emitting device having a gate and an array of emitter tips.

FIG. 1 shows an embodiment of a system 1 for measuring and controlling the local electrical potential difference between a space object 2 and an external ambient space plasma environment 6. In one embodiment, the space object 2 is a spacecraft such as a space probe, a satellite, a solar panel array, a space telescope, a space shuttle, a space station or platform, or other space structures. The space object 2 can be in orbit around the Earth or other celestial bodies (i.e., low-earth orbit, geo-synchronous orbit, or polar orbit), or be in transit through interstellar space. The space object 2 has a structure (or frame) 7 that is exposed to or surrounded by the ambient space plasma environment 6.

The system 1 includes an electrically controllable charge-emitting device 4 in communication with a control system 8. The charge-emitting device 4 is mounted to the object structure 7 and includes two terminals. As shown, one of the terminals is a gate terminal (gate) 16 and the other terminal is a charge-emitting terminal (emitter) 14. For embodiments of charge-emitting devices that dispense fluids the emitter is referred to as a nozzle.

In one embodiment, the gate 16 is physically mounted flush with the external surface, but is electrically isolated from the external surface by the control system 8. The gate 16 and an associated voltage with respect to the charge emitting terminal 14 are used to activate and control emission of charge from the charge-emitting device 4. Accordingly, the charge-emitting device 4 is also referred to as a gated charge-emitting device.

The charge-emitting terminal 14 includes a plurality of emitter tips 15 from which electric charge 17 emanates through the gate terminal 16 to the space plasma environment 6. In some applications of charge-emitting devices, some of the emitted charge 17 returns to the gate 16. The emitted charge 17 can have a positive or negative polarity, depending in part upon the bias of the voltage applied across the two terminals of the charge-emitting device 4. The charge-emitting device 4 emits the charge 17 under the control of the control system 8.

The control system 8 has an internal reference ground connection to the object structure 7, and receives power 10 from an internal power supply (not shown) capable of providing an adequate bias voltage (typically less than 100V between the emitter 14 and the gate 16). For embodiments of charge-emitting devices that dispense fluid, the bias voltage in some embodiments is less than approximately 200 volts between the gate 16 and the emitter (i.e., nozzle) 14 (or the fluid in the nozzle). The control system 8 also receives telemetry and command signals 12. Such signals 12 can originate from ground control or another space vehicle. In some embodiments, the control system 8 may be as simple as a voltage between the emitting terminal 14 and the gate 16 resulting from the interaction of the object 2 and object components and the space plasma environment 6. Thus, the voltage naturally provided by such interactions can drive the charge emitted by the charge-emitting device 4.

Usually, the object 2 interacts within the ambient space plasma environment 6 such that charge 18 builds on the object structure 7. The charge build-up causes a potential difference to form between the object 2 and the ambient space plasma environment 6. Typically, the nature of such interactions with the environment 6 causes the object 2 to become negatively charged with respect to the space plasma environment 6. In one embodiment, the charge-emitting device 4 draws a current 20 comprised of the negatively charged electrons from the structure 7 and emits the electrons as a current 17 into the ambient space plasma environment 6.

Depending upon the rate of emitting the electrons 17 into the environment 6, the charge-emitting device 4 can lower (i.e., make less negative) or maintain the negative potential difference between the object 2 and its environment 6. In another embodiment, the charge-emitting device 4 is configured to emit positively charged ions into the ambient space plasma environment 6, which increases the negative potential difference between the object 2 with respect to its environment 6.

Under other circumstances, the object 2 can become positively charged with respect to that environment 6. For such situations, the charge-emitting device 4 can be configured to emit positive ions into the ambient space plasma environment 6, to lower (i.e., make less positive) or maintain the positive potential difference between the object 2 and its environment 6. Alternatively, the charge-emitting device 4 can be configured to emit electrons or negatively charged ions into the ambient space plasma environment 6, and to increase thereby the positive potential difference between the object 2 with respect to its environment 6.

For each of the above-described embodiments, the space plasma environment 6 provides a near vacuum through which the charge 17 can propagate away from the charge-emitting device 4, and consequently from the object 2 itself. For embodiments of charge-emitting devices that dispense fluid, a vacuum is not required and fluid may travel in air or other media.

Field Emission Device

Figure 2:
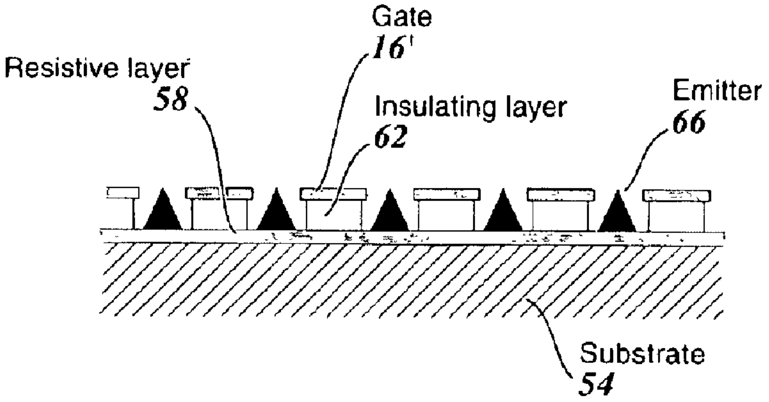
FIG. 2 is a partial cross-section of an embodiment of a field emission device, which is a particular embodiment of the charge-emitting device of FIG. 1.

Referring to FIG. 2, one particular embodiment of the charge-emitting device 4 is an electron field emission device array 50 having a gate 16' and an array of emitters 66. Throughout the specification, electron field emission device arrays are interchangeably referred to as field emission devices.

One embodiment of the field emission device 50 is a Spindt cathode device, manufactured by SRI International of Menlo Park, Calif. and described in U.S. Pat. No. 3,789,471, issued to Spindt et al, on Feb. 5, 1974. In general, the current emission level of the field emission device 50 is controlled by adjusting the voltage of the gate 16' relative to the tips of the emitters 66. Because of the small scales of geometry of the gate 16' and emitters 66, operating voltages for controlling current emission from each emitter tip 66 range typically between 50 volts and 100 volts. Thus, the field emission device 50 has an advantage of being efficient at generating electrons while requiring low electrical power. More specifically, applying an operating voltage above a threshold induces the emitter tips 66 to emit electrons, and further increasing this voltage causes an increase in the emitted current. Another advantage of the field emission device 50 is that the device 50 operates cleanly, i.e., without contaminants associated with thermionic emission from electron guns or the flow of ionization gas associated with plasma contactors, such as a hollow cathode device.

The field emission device 50 is fabricated on a substrate 54 that is typically, but not limited to, a semiconductor (e.g., silicon) or an insulator (e.g., glass). The substrate 54 may include an upper resistive layer 58 (e.g., 100 M-ohms) to improve uniformity of emission from the emitters 66 in the array 50. Although a higher drive voltage becomes necessary to achieve comparable emission current, the resistive layer 58 provides significant failure protection on an emitter tip by tip basis and increases field emission device reliability and emitter tip longevity in the space plasma environment 6.

An insulating oxide layer 62 (e.g., silicon dioxide) covers the substrate 54 (or the resistive layer 58).

A conducting film (e.g., molybdenum) coats the insulating layer 62. This conducting film can be a metal, a resistive material, or a semiconductor. An array of holes (or cavities) is etched through the conducting film and the insulating layer 62 to the substrate 54 (or to the resistive layer 58) using semiconductor manufacturing techniques. The conducting film remaining after the etching of the holes forms the gate 16' of the field emission device 50.

Emitters 66 comprised of conducting material (e.g., molybdenum) are formed in the holes. Devices have been built with up to approximately $10^7$ emitters 66 per square centimeter, but this is not an upper limit. In one embodiment, the base of each emitter 66 is on the substrate 54 (or on the resistive layer 58) and the tip of each emitter 66 (i.e., the emitter tip) is in the plane of the gate 16'. The tip aspect ratio, its length and width, and the shape can be designed to tailor the characteristics of the device 50. For those embodiments having a resistive layer 58, each emitter tip behaves effectively as if in series with a resistor.

The small scale of the individual emitter tips causes the array 50 to be sensitive to the chemistry of the environment 6 in which array 50 operates. Consequently, when a benign environment is not guaranteed, non-reactive coatings or materials may be desirable to reduce susceptibility to degradation caused by surface chemistry and absorbates. A commonly used tip material is molybdenum, which is known to be reactive with atomic oxygen, a primary chemical species in the low-orbit plasma environment surrounding the Earth. Molybdenum tips have proved rugged and have survived atmospheric exposure and operation in many gas environments. Other tip materials can be considered, such as silicon carbide, titanium, and chromium. Tip coatings can also have a secondary benefit of reducing gate voltage needed to emit a certain current level.

The process for fabricating field emission devices 50 can be modified to produce field emission devices incorporating other selected materials, insulators, and geometries. For example, wedge-shaped emitter arrays can be formed using cavities that are slots instead of holes.

Figure 3:
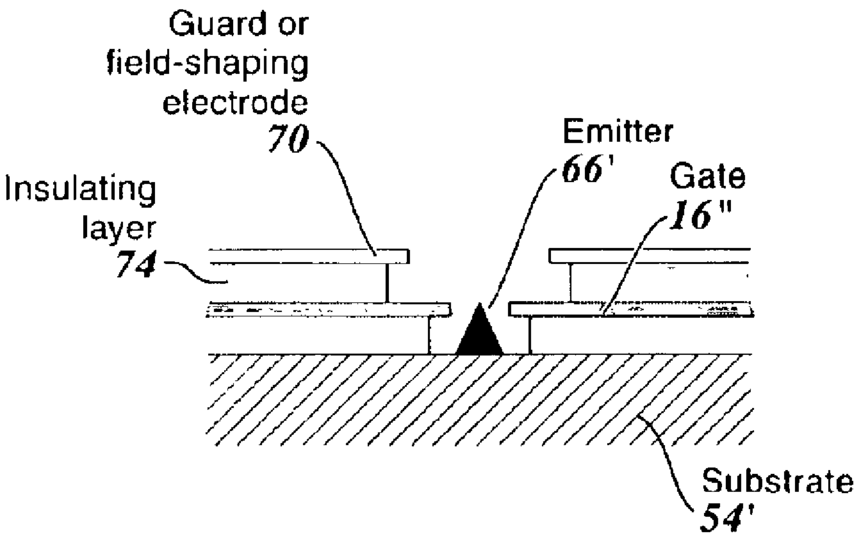
FIG. 3 is a partial cross-section of another embodiment of the field emission device.

As another example, FIG. 3 shows a geometric variation in which another electrode 70 has been added to the structure of FIG. 2 (without a resistive layer 58) to form a multi-electrode structure. The electrode 70 is formed from a metal layer that covers an insulating layer 74 deposited on the gate 16". The electrode 70 modulates or controls the beam emitted by emitter 66' by shaping the trajectories of the emitted electrons or serving as an additional integrated gate. Moreover, the additional guard electrode 70 can be used to allow more precise gate current measurements by shielding the gate 16" from the external plasma environment 6.

Another example of a geometric variation is to alter the relative position of the tip of the emitter 66 with respect to the gate 16'. By shortening the height of the emitters 66 so that the tip of each emitter 66 is below the plane of the gate 16', and consequently further from the cavity opening, more current emitted from the emitter tip flows to the gate 16' and not to the plasma environment 6. This geometric variation can also be used to allow more precise gate current measurements by increasing the gate current to a measurable amount.

Figure 4:
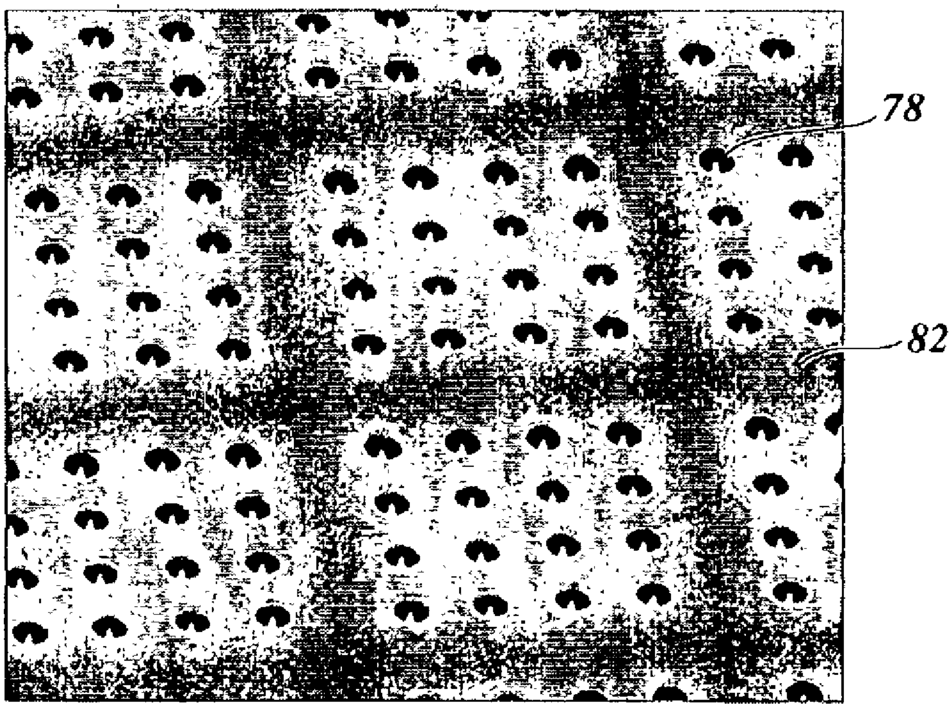
FIG. 4 is a top view of an embodiment of the field emission device.

FIG. 4 shows a top view of an embodiment of the field emission device 50 fabricated on a single integrated circuit (IC) 82 and having an exemplary arrangement of cavities 78 within which the emitter tips 66 reside. Current fabrication capabilities can produce the IC 82 having a packing density of $5\times10^7$ emitter tips/cm$^2$. With each emitter tip 66 having a tested capability of emitting 100 $\mu$A, the IC 82 can conceivably produce 5000 amps/cm$^2$. Further, this type of field emission device 50 has been operated over a temperature range of approximately −270° C. and 900° C.

Figure 5:
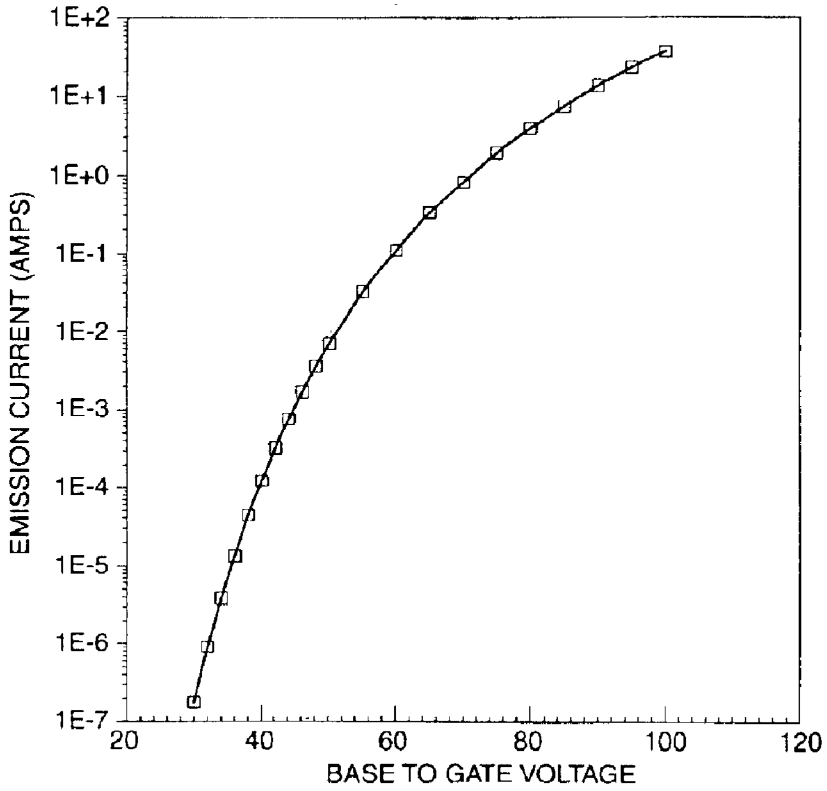
FIG. 5 is a plot of modeled I-V characteristics of one embodiment of the field emission device.

FIG. 5 shows a plot of modeled I-V characteristics of one embodiment of the field emission device 50, i.e., a Spindt cathode device with an array of 5 million emitter tips, for applied voltages between 30 and 100 volts. As shown, the Spindt cathode device can achieve 0.1 amperes of emission current with approximately 60 volts applied between the gate 16 and the base of the emitters. An increase in the gate voltage to approximately 70 volts increases the current emission to approximately 1 ampere. This plot illustrates a characteristic of the Spindt cathode device, and of field emission devices in general, that the gated structure of the device allows low voltages between the gate electrode and emitter tips to control the emission of electrons.

Figure 6:
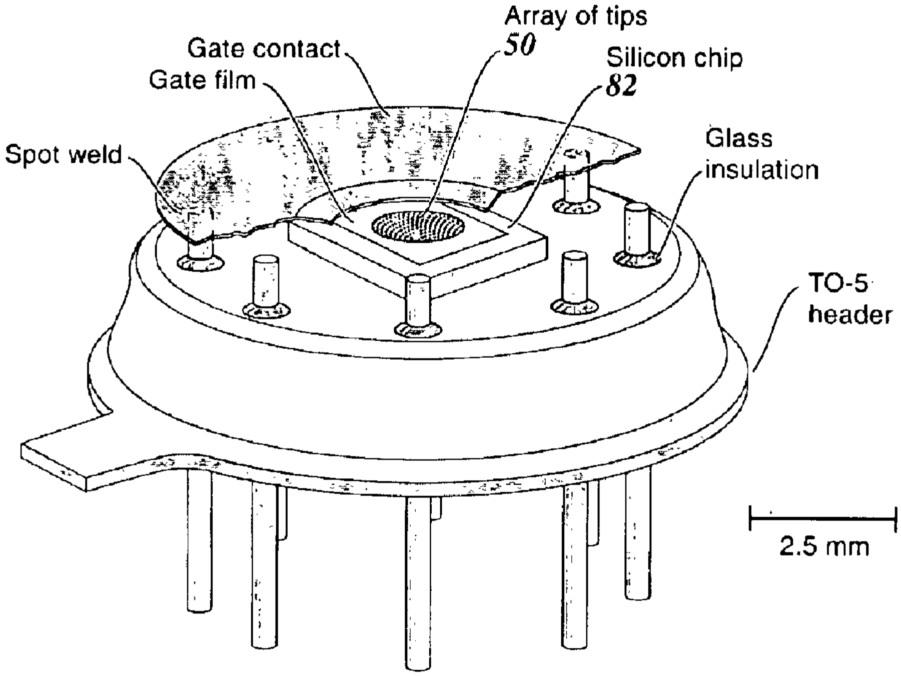
FIG. 6 is a diagram of an embodiment of a component that incorporates the field emission device.

FIG. 6 shows the integrated circuit 82 of FIG. 4, including the field emission device 50, mounted on a standard TO-5 header. As shown, the diameter of the shown embodiment of the standard TO-5 header is approximately 10 mm. Because the field emission device 50 has a large operating temperature range, is lightweight and small in size compared to other electron emitting technologies (e.g., an electron gun), the field emission device 50 is better suited than such emitting technologies for space-based applications.

Figure 7:
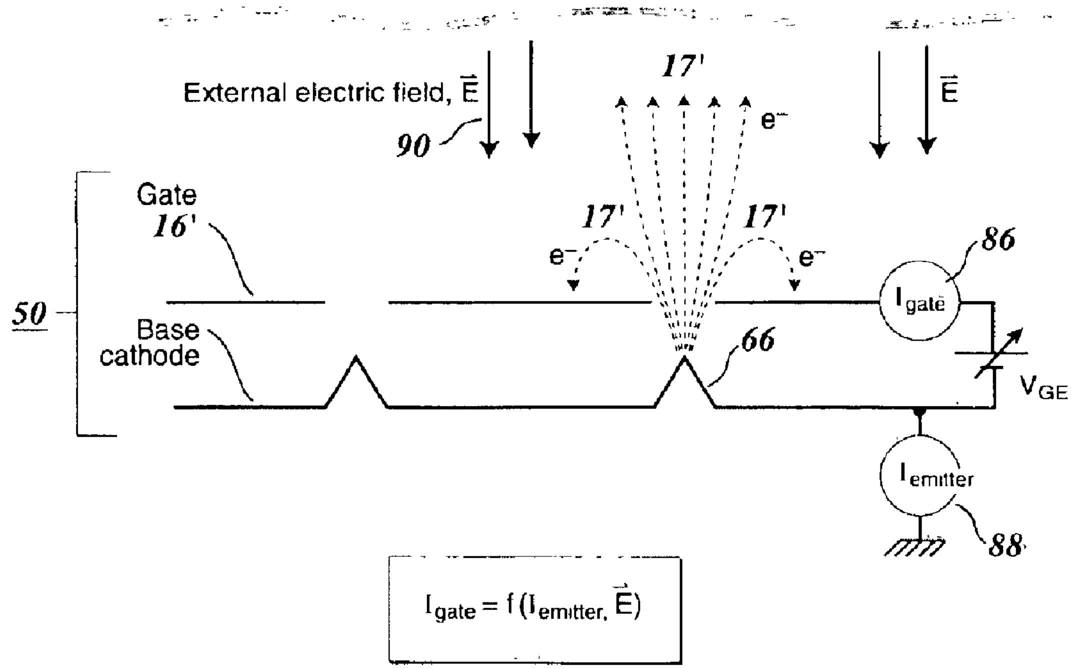
FIG. 7 is a schematic representation of the operation of the field emission device, using space plasma as a virtual anode.

FIG. 7 shows an embodiment of a schematic representation of the operation of the field emission device 50 shown in FIG. 2. In this embodiment, the field emission device 50 is located within the space plasma environment 6' and is at a negative potential with respect to that environment 6'. This negative potential difference between the field emission device 50 with respect to the space plasma environment 6' results in an external electric field E. The greater the potential difference, the stronger this electric field E.

A voltage $V_{GE}$ is applied between the gate 16' and the base of the emitter tips 66. Typically, $V_{GE}$ is less than 100 volts, but voltages greater than 100 volts can be used. The applied voltage $V_{GE}$ induces the emitter tips to emit electrons 17'. The rate of emission produces an emitter current, ($I_{emitter}$), which can be monitored by a current monitor 88. Some of the emitted electrons 17 of the emitter current $I_{emitter}$ flow to the space plasma environment 6'; other electrons 17 flow to the gate 16' to contribute to a gate current, $I_{gate}$, which can be measured by a current monitor 86. The gate current is a function of the emitter current and the electric field E ($I_{gate}=f(I_{emitter}, E)$).

With the applied voltage $V_{GE}$ remaining constant, and consequently the emitter current $I_{emitter}$ remaining constant, if the strength of the electric field E decreases, the current flowing to the gate 16' typically increases. That is, an increasing number of electrons 17' of the emitter current $I_{emitter}$ are typically collected by the gate 16' instead of reaching the space plasma environment 6'.

Conversely, if the strength of the electric field E increases, the number of electrons flowing to the gate typically decreases because an increasing number of the electrons 17' of the emitter current typically pass through the gate 16' to the space plasma environment 6' rather than be collected by the gate 16'. Such devices 50 have been operated continuously and in switched modes where the current flow is varied or cycled on and off at speeds beyond $10^9$ cycles per second.

Field Ionization Device

Figure 8:
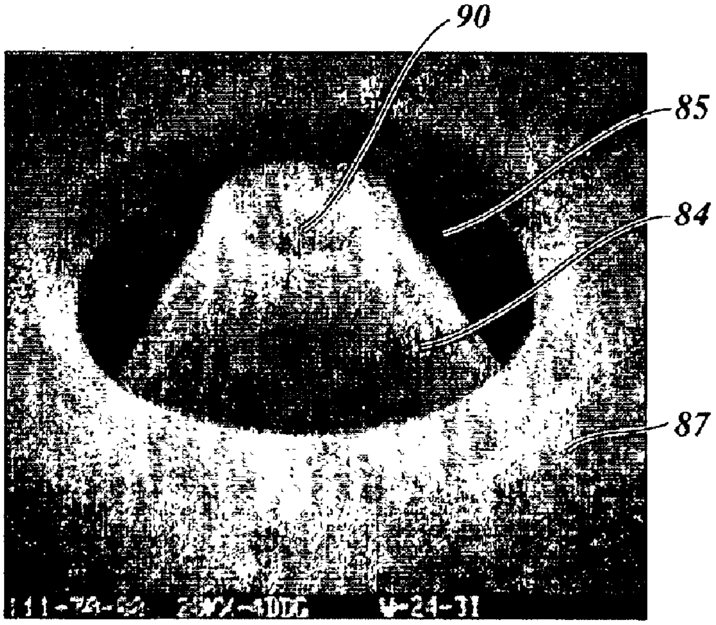
FIG. 8 is a scanning electron microscope image of an embodiment of a field ionization device, which is a particular embodiment of the charge-emitting device of FIG. 1 and can be used to dispense fluids in accordance with the principles of the invention, the field ionization device having a fluid-dispensing structure comprising an electrically conductive nozzle and an integrated gate electrode.

Another embodiment of the charge-emitting device 4 is a field ionization device array that emits positive or negative ions. In one embodiment of the field ionization device array, each emitter 66 is configured into the shape of a micro-volcano. FIG. 8 shows a scanning electron microscope image of one such micro-volcano emitter (or nozzle) 84 within a hole 85 in the field ionization device array. The micro-volcano emitter 84 is electrically conductive and includes an open-ended channel 90 for conducting a fluid, such as gas, liquid, and liquid metal. An integrated electrically conductive gate 87 is disposed adjacent to the emitter 84. The integrated gate 87 is built on material surrounding the emitter 84, and preferably on insulating materials if the surrounding material is electrically conductive.

Gases, liquids, or liquid-metals are supplied through the field ionization device array to provide a source of positive ions. When the bias voltage across the gate and the micro-volcano emitters is negative, the positive ions release into the space plasma environment 6. Reversing the bias voltage and operating without expendables, the micro-volcano emitters can be induced to release electrons. Accordingly, this embodiment of the charge-emitting device 4 is capable of switching between electron emission and ion emission. An example of a field ionization device array that is suitable for practicing the principles of the invention is described in U.S. Pat. No. 4,926,056, issued to Charles A. Spindt, on May 15, 1990, the entirety of which is incorporated by reference herein.

Another class of applications in which to use this type of field ionization device is for dispensing small controlled volumes of fluid in the femto-liter range (with the ability to dispense larger volumes). For the purpose of illustrating the present invention, the following description refers to the ionizing or dispensing of fluids that are liquids, although the principles of the invention apply also to the ionizing or dispensing of fluids that are in gaseous or supercritical (i.e., neither liquid nor gas) states. Types of fluids that can be dispensed by this field ionization device (hereafter, fluid-dispensing device) and by the fluid-dispensing devices described below include, but are not limited to, aqueous liquids (i.e., water or water-based), organic liquids, inorganic liquids, combinations of organic, inorganic, and aqueous liquids, liquids containing dimethylsulfoxide (DMSO), biological molecules such as DNA, RNA, and proteins, or other water miscible organic solvents, oils, reagents, ink, chemicals, and liquid metal. When a liquid is used in the fluid dispensing device to generate ions, liquid droplets, or streams, two mechanisms can play a role in causing the dispensing. These two mechanisms are field ionization, typically associated with gases, and field evaporation, typically associated with liquids.

For this type of application, the micro-volcano emitter 84 functions as a fluid-conducting micro-nozzle or capillary (hereafter referred to as a nozzle). The electrically conductive nozzle 84 functions as an electrode and, although capable of being used with conductive fluids, the conductive nozzle also works with a poorly conducting or electrically nonconductive fluid, for example, oil, ink, and any poorly conductive liquid.

The integrated gate 87 functions as a second electrode (referred to hereafter as the gate electrode). Integrating the gate electrode 87 in the fluid-dispensing structure with the nozzle 84, and in close proximity to the tip of the nozzle 84 (e.g., less than a micron separation), enables extraction of fluid from the channel 90 without the need of an additional extracting electrode biased at a high voltage (i.e., greater than 500 volts).

During operation of the fluid-dispensing device, fluid to be dispensed is drawn to the open-ended tip of the channel 90 by capillary action (in the case where the fluid is liquid). In another embodiment, a pumping means urges the fluid to the channel tip. Fluid dispensing then occurs by applying sufficient voltage between the nozzle 84 and the gate electrode 87. Either a positive or negative voltage differential can be applied, but preferably the nozzle 84 is biased positive relative to the gate electrode 87 in order to achieve more stable fluid dispensing than that capable with a negative bias.

Control of fluid dispensing occurs through the use of electrostatic forces. The small scale size of the fluid-dispensing structure and the fluid shape imposed by electrostatic forces produce electric field strengths in the vicinity of the fluid that are sufficient to achieve Taylor cone formation. The properties of the fluid being dispensed, for example, its electrical conductivity, dielectric constant, and surface tension, affect how the electrostatic forces interact with the fluid. For some fluids, ions are first released when the electric field exceeds the Taylor cone formation regime. As used herein, an ion is a charged atom or a charged molecule, such as a single atom or a DNA molecule, and not a fluid by itself. As the electric field increases, individual droplets and then a stream of droplets emerge from the nozzle tip. For other fluids, the initial extraction of fluid is in the form of micro-droplets. Typically, the dispensed fluid has a net charge, but for some fluids, the dispensed fluid may have no net charge (i.e., uncharged).

The small-scale sizes of the fluid-dispensing structure and the electrostatic control of fluid delivery permits the voltages involved in the control of fluid dispensing to be considerably lower than traditional electro-spray devices which require voltages of order 0.5 kilovolts or higher between electrodes. The integrated gate electrode 87 achieves this reduction in the voltage needed to extract fluid because of the close proximity of the gate electrode relative to the fluid being dispensed. In addition, the geometry of the gate electrode 87 and the electric field concentration accomplished by the fluid shape imposed by the electrostatic forces cause further electric field gradient increases near the Taylor cone tip, and thus lower voltages are required to achieve ionization and Taylor cone formation.

Accordingly, in some embodiments the magnitude of the applied voltage sufficient to induce the flow of fluid is less than approximately 200 volts. Lower voltages in the range of 50 to 100 volts can induce ionization (or the delivery of ions). As the magnitude of the voltage difference increases (e.g., 50 to 100 volts, −50 to −100 volts), a mist or small droplets of fluid exit the nozzle 87. Further increases in the voltage difference induce large droplets, then jets or streams of fluid to flow. Thus, controlling the applied voltage enables the desired rate of fluid flow to be achieved.

Power reduction also results from the fluid-dispensing structure because the gate electrode 87 does not intercept the dispensed fluid (which represents an electrical current). The highly concentrated electric field at the tip of the Taylor cone provides the fluid with sufficient inertia and directed motion to escape collection by the gate electrode 87. As a result, the power needed to operate the gate electrode 87 is small compared to traditional electro-spray technologies. Also, instruments, equipment, units, and systems that incorporate low-power fluid-dispensing devices can be made portable.

Figure 9:
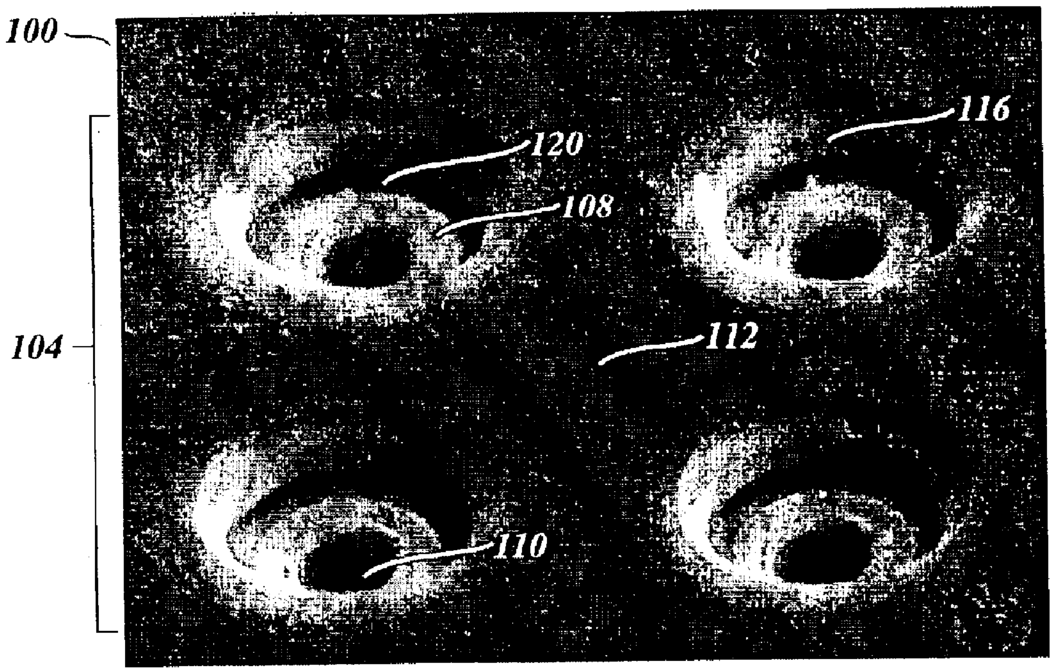
FIG. 9 is a scanning electron microscope image of a portion of another embodiment of a fluid-dispensing device having an array of electrically nonconductive nozzles and an integrated gate electrode.

FIG. 9 shows a portion of another embodiment of a fluid-dispensing device 100 including an array 104 of micro-nozzles (hereafter nozzles) 108 and an integrated gate electrode 112. Although only a two-by-two array of nozzles is shown, arrays of nozzles having on the order of $10^6$ nozzles/$cm^2$ have been fabricated.

The nozzles 108 are formed in a substrate 120 (e.g., silicon) and, in the embodiment shown, are constructed of electrically nonconductive material (e.g., silicon oxide or silicon nitride). Sizes of nozzles range from approximately 0.1 to 100 microns in diameter. For embodiments in which the nozzles 108 are electrically nonconductive, preferably the fluid within the nozzles 108 is electrically conductive and thus capable of functioning as one of the two electrodes that cooperate to extract the fluid. In this configuration the gate electrode 112 is the other electrode. Examples of electrically conductive fluids include, but are not limited to, liquid metals, water solutions, DMSO, blood, etc.

Each nozzle 108 includes an open-ended fluid-conducting channel 110. Also, in this embodiment the nozzles 108 are cylindrical in shape. Nozzles of the present invention can have, in general, a variety of shapes (e.g., conical, cylindrical, rectangular, etc.), provided the fluid in the nozzle can form a Taylor cone as described above.

A dielectric spacer 116 is disposed between the gate electrode 112 and the substrate 120 to electrically isolate the gate electrode 112 from the substrate 120. Examples of dielectric material for constructing the spacer 116 include silicon oxide and silicon nitride. The thickness of the dielectric spacer 116 is sufficiently sized to prevent breakdown at the operating voltage, and to retain the physical integrity of the device structure throughout fabrication. The gate electrode 112 and underlying dielectric spacer 116 have an opening positioned above each one of the nozzles 108 so that fluid emanating from the open end of the channel 110 can pass by the gate electrode 112 to a receiving instrument (not shown). In the embodiment shown, the gate electrode 112 is disposed symmetrically about the nozzle. In other embodiments (not shown), the position of the gate electrode 112 is asymmetric with respect to the nozzle tip (e.g., closer to one side of the nozzle tip than to another side).

Examples of material for constructing the gate electrode 112 include, but are not limited to, semiconductors, such as silicon and polysilicon, and conductors such as nickel, platinum, and aluminum. Also in the shown embodiment, the gate electrode 112 for extracting the fluid is separated from the open-ended tip of the nozzle by approximately one to three microns. The gate electrode 112 can be separated from the nozzle tip by greater than three microns without departing from the principles of the invention, provided the separation is not so great as to require for fluid dispensing high voltages that can also cause a dielectric breakdown and/or arcing.

In another embodiment (not shown), the gate electrode 112 is constructed on the dielectric material of the nozzle 108 to bring the gate electrode 112 closer to the fluid at the nozzle tip than for the embodiment shown.

Fluid dispensing occurs with the array 104 of nozzles 108 upon the same principles described above in FIG. 8 for the fluid-dispensing structure having the electrically conductive nozzle. In the embodiment shown in FIG. 9, a voltage applied to the gate electrode 112 (with respect to the fluid in the nozzles 108) induces the fluid to form a Taylor cone on each of the nozzles 108 in the array and then to leave that nozzle 108 along electric field lines.

The small scale of the fluid-dispensing structure and close proximity of the gate electrode 112 to each nozzle 108 means that the high electric fields needed for fluid dispensing are localized to the region between the gate electrode 112 and that nozzle 108. As a result, actuation (i.e., applying a voltage that achieves fluid dispensing) of one nozzle 108 does not yield electric fields at the other nozzles 108 that can cause unintended actuation. So individual nozzles in an array, at scale sizes that allow densities with microns between nozzle centers, can be independently gated and therefore actuated independently, in groups or sub-arrays, by row, by column, or all at one time, sequentially or simultaneously, as needed for a given application. Simultaneous actuation means that the nozzles start dispensing fluid or are presently dispensing fluid at the same time (not necessarily starting or stopping at the same time). Sequential actuation means that different nozzles start dispensing at different times. Such sequentially actuated nozzles can have overlapping or non-overlapping periods of fluid dispensing and can stop dispensing at the same or at different times.

Accordingly, in one embodiment the gate electrode 112 is partitioned into a plurality of individually addressable gate electrodes. Each individually addressable gate electrode can activate and control fluid dispensing for a subset (i.e., one or more) of the nozzles 108 in the array 104. For example, on a single fluid-dispensing device individually addressable gate electrodes can be configured to actuate a single nozzle, other electrodes tens, hundreds, thousands, tens of thousands, and/or hundreds of thousands of nozzles. In one embodiment, addressing the individually addressable gate electrodes for selectively applying a voltage thereto occurs in like manner to the addressing of individual memory cells in an integrated circuit memory device.

Micro-fabrication of devices with fluid-dispensing structures (i.e., structures with a nozzle and integrated gate electrode), such as those described above in FIG. 8 and in FIG. 9, is based on standard semiconductor fabrication techniques. The properties of materials that can be used to fabricate the devices vary, including both conducting and non-conducting materials, and can be tailored to a particular application and liquids of interest (e.g., liquid metals, biological fluids, organic and inorganic solvents, liquids with dissolved material or with molecules in suspension, such as DNA, proteins, and other biological markers, and non-conducting liquids and gasses when a conducting nozzle is used). One embodiment employs materials and fabrication techniques similar to those described above for field emission devices.

Advantages gained by standard micro-fabrication techniques include the ability to control positioning and fabrication of small repeatable fluid-dispensing structures with resolution to sub-micron scales (and at low cost if large-scale manufacturing is done), the ability to reproduce fluid-dispensing structures over substrates of varying sizes and thus produce devices with parallel structures (or arrays), and the ability to integrate the devices with electronics technologies and existing technologies based on semiconductor fabrication.

Figure 10:
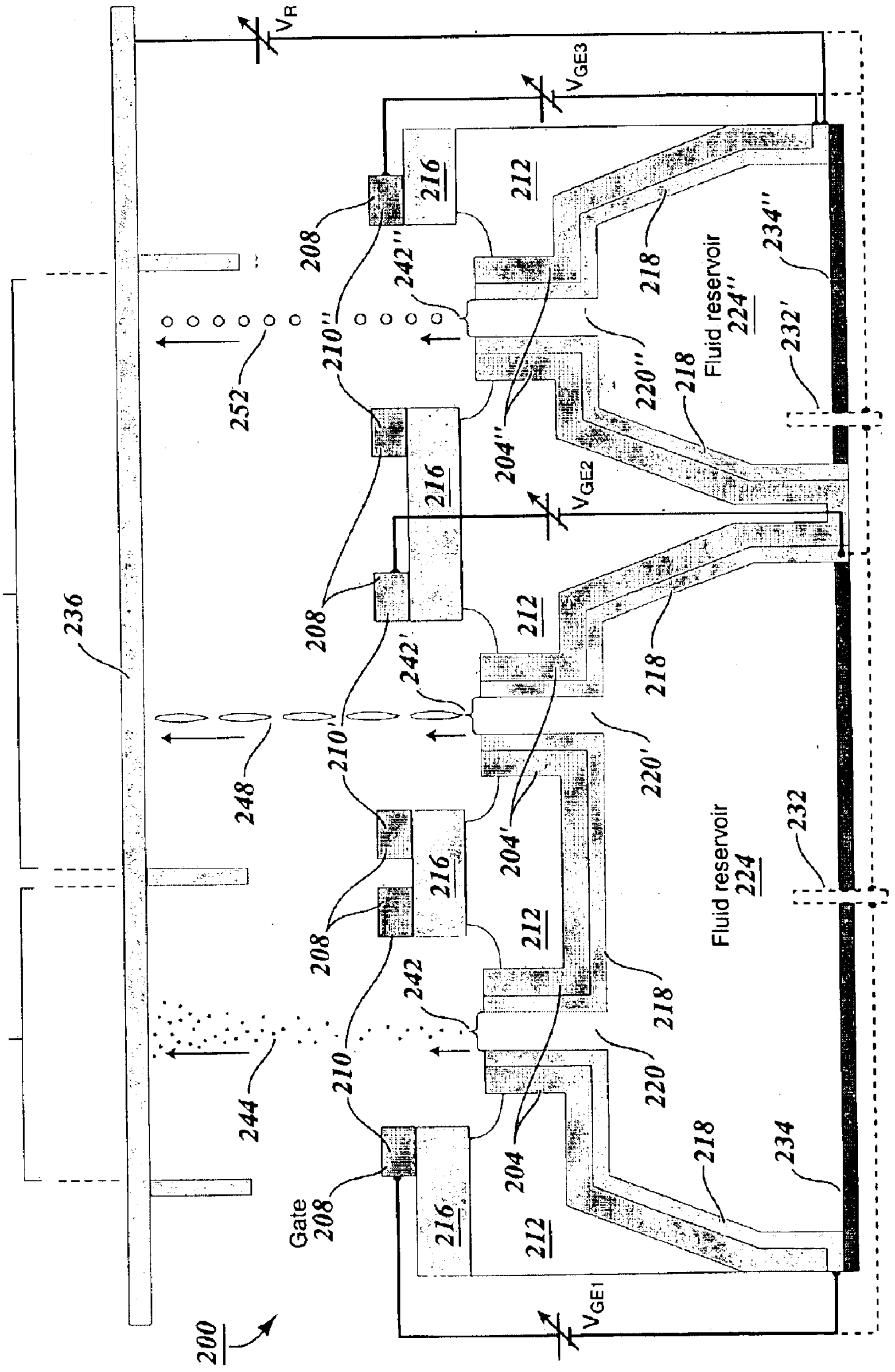
FIG. 10 is a cross-sectional diagram of a portion of an embodiment of a fluid-dispensing device having an array of nozzles and individually addressable gate electrodes.

FIG. 10 shows a cross section of a portion of an embodiment of a micro-fabricated fluid-dispensing device 200 including a plurality of nozzles 204, 204', 204" (generally nozzle 204) and an integrated gate electrode 208. The nozzles 204 are formed in a substrate 212 and, in this embodiment, constructed of electrically non-conductive material. In other embodiments, some of the nozzles 204 are electrically non-conductive and other nozzles 204 are electrically conductive (or semi-conductive) and insulated from the gate electrode 208 by non-conducting material. The different electrical conductivities of the nozzles enable the nozzles to work with different types of fluids (e.g., conductive nozzles improve performance with less conductive fluids and nonconductive nozzles work well with conductive fluids while tending to interact less chemically with the fluid).

Each nozzle 204, 204', 204" has an open-ended tip and a fluid-conducting channel 220, 220', 220", respectively (generally, channel 220), and each channel 220 connects the respective open-ended tip to a source of fluid to obtain fluid through passive or active means, such as capillary action and pumping, respectively. The fluid source can be a reservoir within the substrate 212 of the device 200 or an external source. Fluid-dispensing structures with reservoirs are, in effect, micro-vessels capable of holding, for example, reaction components for a variety of purposes such as dispensing, testing, mixing, and exposing to processing.

In the embodiment shown in FIG. 10, the fluid-dispensing device 200 includes a plurality of fluid reservoirs 224, 224". Each nozzle 204 either shares or has exclusive use of a fluid reservoir. For example, nozzles 204, 204' share the fluid reservoir 224 and nozzle 204" has exclusive use of the fluid reservoir 224". Separate reservoirs enable the dispensing of different fluids by different nozzles, a feature that is useful for mixing and testing. In another embodiment (not shown), all nozzles on the fluid-dispensing device share a single fluid reservoir.

Insertion of the fluid into the reservoirs 224, 224" can occur at the time of fabricating the device 200, and thus the fluid is included in the device 200 when the device 200 is shipped or sold, or insertion can occur during the use of the device 200 (i.e., post-fabrication). Instruments for inserting fluid into a fluid reservoir include, but are not limited to, pipettes, droppers, other micro-fluidic delivery, dispensing, or channel structures, or micro-nozzle structures of the type described herein (i.e., cascaded fluid-dispensing devices), and can be of different sizes to handle different volumes.

A spacer or layer 216 is disposed between the gate electrode 208 and the substrate 212. For a non-conducting substrate 212, the gate electrode 208 can be disposed on the substrate 212 (i.e., without an intervening spacer 216). If the substrate 212 is electrically conducting, a non-conducting spacer 216 is used to electrically isolate the gate electrode 208 from the substrate 212. Also, a voltage can be applied to the conductive substrate 212 to control the electric field lines at the nozzle tip and, by controlling the electric field lines, to restrict the movement of dispensed ions or fluid toward the gate electrode 208.

In the embodiment shown, the gate electrode 208 comprises a plurality of individually addressable gate electrodes 210, 210', 210" (generally, gate electrode 210). Each individually addressable gate electrode 210 is located adjacent to the open-ended fluid-dispensing tip of a corresponding nozzle 204 (typically within two to three microns of the tip). The individually addressable gate electrode 210 can be situated above, below, or on the same plane as the open-ended tip of the corresponding nozzle 204.

To enable the application of a voltage between each gate electrode 210 and the fluid in the corresponding nozzle 204, electrical contact is made with the fluid through the use of a conductive film or layer 218 or through direct contact with the fluid by an electrode 232, 232' (e.g., a conductive needle), or both. This conductive layer 218, shown as a shaded region, used preferably with electrically non-conductive nozzles, lines the inside walls of the reservoirs 224, 224" and each channel 220 to achieve electrical contact with the fluid. For embodiments with electrically conductive nozzles, the nozzles 204 are insulated from the gate electrode 210 by an insulating substrate 212 or a non-conducting spacer 216, and the conductive layer 218 is unnecessary, provided electrical contact with the nozzle 204 is attainable. Other conductive films 234, 234" (shaded) can also extend along the base of the device 200 to form an exposed outer surface that provides electrical contact to the liquid or nozzle 204 through a socket or plug adapted to receive and form an electrical connection to the device 200 (similar in function and operation to the external base electrode of a watch battery).

To induce fluid dispensing from the nozzles 204, voltages are applied between each of the individually addressable gate electrodes 210 and the fluid in the corresponding nozzle 204. A feature of individually addressable gate electrodes is that different voltages can be applied to induce different nozzles to dispense fluid at different rates. For example, as shown in FIG. 10, nozzle 204 dispenses a mist 244, nozzle 204' dispenses droplets 248, and nozzle 204" dispenses ions 252 under the influence of the electric fields locally generated by the applied voltages $V_{GE1}$, $V_{GE2}$, and $V_{GE3}$, respectively. The extracted mist 244, droplets 248, and ions 252 emerge from the tips of Taylor cones 242, 242', and 242", respectively. In this particular example, the different volumes of extracted fluid are dispensed because the magnitude of $V_{GE2}$ is different than that of $V_{GE1}$, which in turn is different than that of $V_{GE3}$.

Some embodiments of the present invention include a receiving reservoir or electrode (receiver) that is biased to attract and collect the ions or fluids that leave a nozzle, although such an electrode is not needed to achieve dispensing from the nozzle(s). The receiving electrode is biased in the same direction as the gate electrode relative to the fluid or nozzle, but at a potential that is greater in magnitude than that of the gate electrode, or at the same potential as the gate electrode. In general, the receiving electrode improves fluid delivery for achieving high rates of fluid flow (in particular, for tightly packed array structures). If the receiver is not an electrode, the dispensed fluid (if ionized) can be charge neutralized at the receiver. One technique for achieving charge neutralization includes providing an electron source near the fluid-dispensing device to neutralize the fluid when dispensed from the nozzle. Another technique includes grounding the receiver.

Receiving electrode (receiver) 236 in FIG. 10 is an example of such a receiver. The distance of the receiver 236 from the fluid-dispensing device 200 depends upon the particular application in which the receiver 236 is being used and the volume(s) of fluid being dispensed. For example, smaller volumes of liquid may require shorter distances to the receiver 236 to reduce the amount of liquid lost due to evaporation before reaching the receiver 236. To reduce the amount of liquid lost to evaporation, some embodiments of the invention include means for controlling evaporation, such as an enclosure, a humidity control chamber, and an environment control chamber (i.e., controls temperature and humidity). In general, such means for evaporation control enclose the fluid-dispensing device 200 and receiver 236.

The receiver 236 has a plurality of wells 240, 240' aligned over the nozzles 204 so that well 240 collects the mist 244 and well 240' collects the droplets 248 and ions 252. Collecting fluid dispensed from two different reservoirs 240, 240', which can contain two different types of fluid, illustrates how the fluid-dispensing device 200 can be used to mix fluids.

A voltage, $V_R$, is applied between the receiver 236 and the fluid. The magnitude of the voltage $V_R$ applied to the receiver 236 is equal to or greater than the voltage of greatest magnitude (here, $V_{GE2}$) applied across the gate electrodes 210 and the fluid (thus if, for example, $V_{GE2}$=200V, then $V_R$ is greater than or equal to 200V, and if, for example, $V_{GE2}$=−200V, then $V_R$ is less than or equal to −200V).

Figure 11:
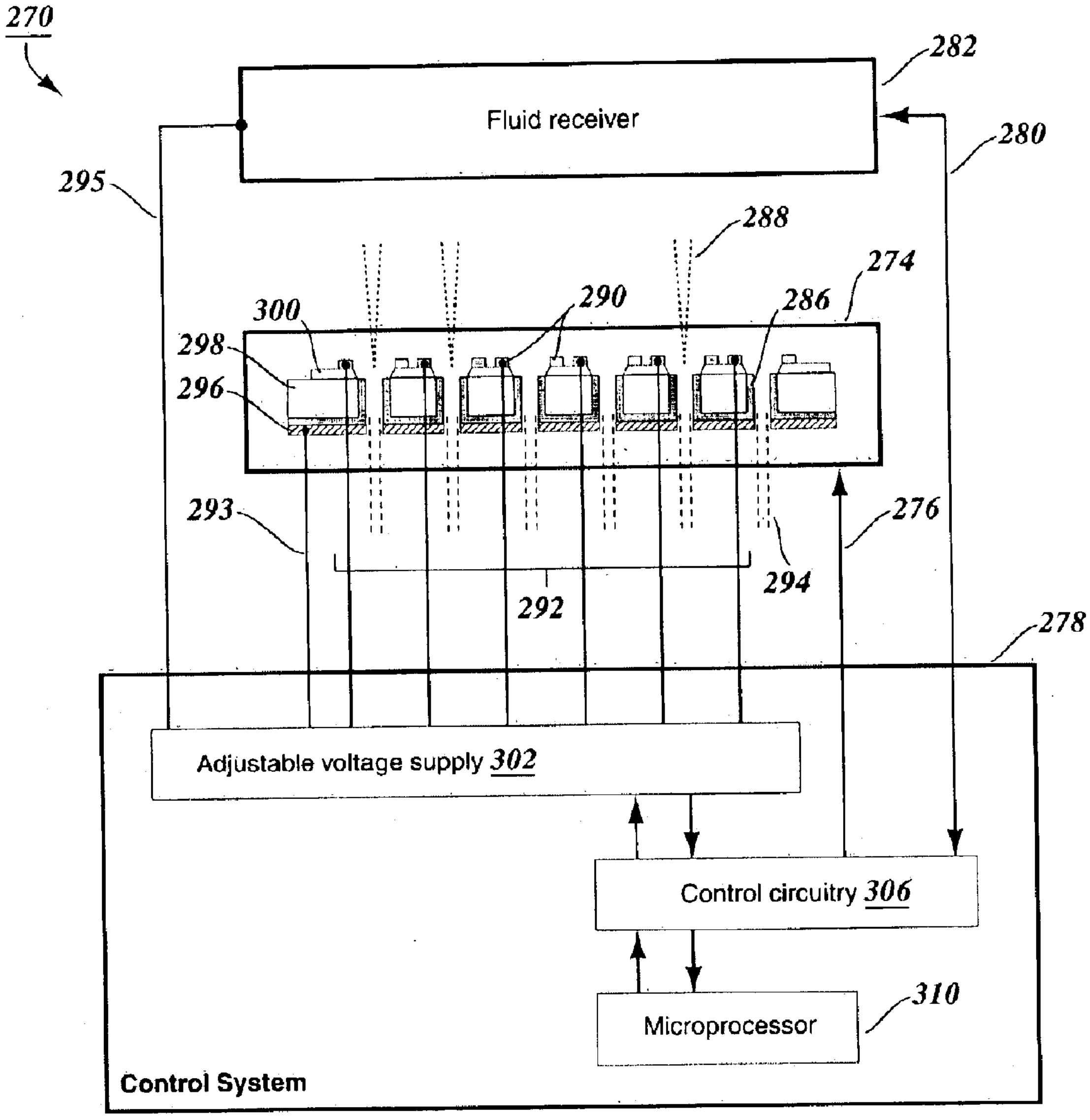
FIG. 11 is a block diagram of an embodiment of a fluid-dispensing system embodying the principles of the invention.

FIG. 11 illustrates an example of an electrical control system that is integrated with a micro-fabricated fluid-dispensing device for automating the process of handling and dispensing fluid. The control system can be attached to a fluid-dispensing device or constructed directly on the same substrate as the device. Pre- and post-analysis and fluid handling stages can also be directly integrated with these fluid-dispensing devices. Accordingly, fluid-dispensing devices are useful in a variety of areas, e.g., aerospace, materials handling and fabrication, biomedical, physical analysis instrumentation, chemical sampling, delivery, and process control.

More specifically, FIG. 11 shows an embodiment of a fluid-handling system 270 that can be customized according to the particular application for which the system 270 is being used. An example of an application is chemical mixing (e.g., using chemical samples, inhibitors, or tracers) at minute levels depending on chemical or other diagnostics performed in the array or other components of the system 270. As another example, the fluid-handling system 270 uses fluid-dispensing devices as dispensing, or "valve-like," components for applications in which the delivery of micro-quantities are desired.

The fluid-handling system 270 includes a micro-fabricated fluid-dispensing device 274 in communication with a control system 278 and a fluid receiver 282. The fluid-dispensing device 274 (partially shown and as an exemplary cross-section) has a substrate 298, a plurality of cylindrical nozzles 286 formed in the substrate 298, and a gate electrode on a dielectric layer 300 disposed on the substrate 298. A conductive film 296 provides an electrical contact to the nozzles 286 or to fluid in the nozzles 286. In this embodiment, the gate electrode has a plurality of individually addressable gate electrodes 290. Each nozzle 286 includes a channel 294 that extends from the tip of that nozzle to an external fluid source (not shown). The same or different fluid sources can provide the same type or different fluids to the nozzles 286 through these channels 294.

The control system 278 includes a microprocessor 310 in communication with control circuitry 306. The microprocessor 310 executes software that achieves the particular function for which the fluid-handling system 270 is designed. The control circuitry 306 is in communication with a voltage supply 302, with the fluid-dispensing device 274 by signal line 276, and with the fluid receiver 282 by signal line 280. The voltage supply 302 is in electrical communication with each of the individually addressable gate electrodes 290 by a supply line 292, with the fluid or nozzles 286 (through the conductive film 296) by a supply line 293, and with the fluid receiver 282 by supply line 295. In one embodiment, the voltage source 302 is dynamically adjustable and capable of applying voltage signals as a pulse or sequence of pulses at various pulse frequencies.

The control system 278 handles the dispensing of fluid from the nozzles 286. One technique, for example, is to vary the amplitude of the voltage applied between the gate electrode and the nozzles (or fluid). Another technique is to vary the pulse length (i.e. duration) of the applied voltage signal. In this instance, the microprocessor 310 and control circuitry 306 of the control system 278 apply the voltage as a single electrical pulse.

Yet another technique is to pulse the voltage (e.g., at a frequency of approximately 1 kHz) and to vary the duty cycle. In this instance, the control circuitry 306 directs the voltage supply 302 to apply the voltage as a series of electrical pulses with a variable duty cycle. Because of the small fluid volumes and scale-sizes of the fluid-dispensing structure involved and the ability to vary the duty cycle of the pulses, field strengths are pulsed (or modulated) in such a way as to control droplet size precisely. The ability to control droplet size enables precise control of a delivered volume. Accordingly, the amount of fluid dispensed is a function of the amplitude of voltage applied between a nozzle 286 or the fluid in the nozzle 286 and the corresponding gate electrode 290, the duration of the applied voltage, the duty cycle and frequency of a sequence of electrical pulses, or a combination of these voltage application means.

Because dispensing can be accomplished with arrays having numerous micro-nozzles that cover a substrate, alignment of such dispensing nozzles can be handled electronically. In one embodiment, the fluid receiver 282 has a defined structure or alignment mark (e.g. optical labels, structural alignment marks, etc.). The control system 278 registers the location of the alignment mark relative to the desired dispensing location, for example, using sensors to read the alignment mark, and then selects for actuation those nozzles aligned with the desired target location.

The ability to individually address particular gate electrodes so as to actuate specific nozzles or sub-arrays of nozzles, without interference between nozzles, allows development of complex patterns (i.e. printing) and precise alignment of dispensing and collecting regions, thus avoiding the need to provide matching devices having ultra-precise physical alignments. In FIG. 11, as an illustrative example, some of the nozzles 286 are actuated and dispense fluid 288 while other nozzles remain off.

The ability to target specific nozzles for actuation also has uses in space-based applications. For example, one space-based application is to employ the gated fluid-dispensing device 274 as an ion or fluid thruster. For this application, the fluid-dispensing device 274 is connected to a space object such that ions or fluid dispensed by the device 274 pass into the space plasma environment. (For this application the receiver 282 is not present or it can be considered to be the space plasma environment.) The dispensed ions or fluid operate to propel the space object in the opposite direction as the dispensed matter. For ion dispensing, ion acceleration electrodes can be positioned near where the ions pass, thus to accelerate the motion of the ions and to increase the thrust for propelling the space object. Actuating specific nozzles, e.g., those nozzles on one side or another of the device 274, can achieve directional control of the motion induced on the space object.

While the invention has been shown and described with reference to specific preferred embodiments, it should be understood by those skilled in the art that various changes in form and detail may be made therein without departing from the spirit and scope of the invention as defined by the following claims.

What is claimed is:

1. A fluid-dispensing device, comprising:

a substrate;

plurality of nozzles formed in the substrate, each nozzle having an open-ended tip and a fluid-conducting channel between the tip and a source of fluid;

a non-conducting spacer on the substrate; and an integrated gate electrode electrically isolated from the substrate by the non-conducting spacer, the gate electrode being located in such proximity of the tip of at least one of the nozzles that applying a voltage difference of sufficient magnitude between the integrated gate electrode and fluid in the fluid-conducting channel of the at least one nozzle causes the fluid to be dispensed from the at least one nozzle without needing to apply a voltage bias to another extracting electrode in order to cause this dispensing of the fluid.

2. The device of claim 1, wherein the dispensed fluid is comprised of one of a droplet and a stream.

3. The device of claim 1, wherein at least one nozzle of the plurality of nozzles is electrically non-conductive.

4. The device of claim 1, wherein at least one nozzle of the plurality of nozzles is electrically non-conductive and another nozzle of the plurality of nozzles is electrically conductive.

5. The device of claim 1, wherein a density of the plurality of nozzles is at least $10^6$ nozzles per square centimeter.

6. The device of claim 1, wherein the gate electrode includes a plurality of individually addressable gate electrodes, each individually addressable gate electrode being located adjacent to at least one of the nozzles to cause fluid to leave the tip of that at least one nozzle in response to a voltage applied to that individually addressable gate electrode.

7. The device of claim 6, further comprising a voltage supply capable of selectively providing different voltages to different individually addressable gate electrodes.

8. The device of claim 6, wherein voltages applied to the individually addressable gate electrodes can cause fluid to leave the tips of a plurality of nozzles simultaneously or sequentially.

9. The device of claim 1, wherein the applied voltage difference comprises a pulse.

10. The device of claim 1, wherein the applied voltage difference comprises a sequence of pulses at a pulse frequency and duty cycle.

11. The device of claim 1, wherein a magnitude of the applied voltage difference is less than approximately 200 volts.

12. The device of claim 1, further comprising the source of fluid, the source of fluid being shared by the plurality of nozzles.

13. The device of claim 1, further comprising a plurality of sources of fluid, and wherein different nozzles of the plurality of nozzles receive fluid from different sources of fluid of the plurality of sources of fluid.

14. The device of claim 1, wherein fluid contained in at least one nozzle is electrically non-conductive.

15. The device of claim 1, wherein fluid contained in at least one nozzle of the plurality of nozzles is electrically non-conductive and fluid contained in at least another nozzle of the plurality of nozzles is electrically conductive.

16. The device of claim 1, further comprising a conductor in electrical communication with the fluid in the at least one nozzle.

17. The device of claim 1, wherein the device is micro-fabricated.

18. The device of claim 1, wherein the dispensed fluid is comprised of one of an organic liquid, an inorganic liquid, and a combination of organic and inorganic liquids.

19. A fluid-dispensing device, comprising:

a substrate;

a plurality of nozzles formed in the substrate, each nozzle having an open-ended tip and a fluid-conducting channel between the tip and a source of fluid; and a plurality of individually addressable gate electrodes supported by the substrate, each individually addressable gate electrode being located in such proximity of at least one of the nozzles that applying a voltage difference of sufficient magnitude between that individually addressable gate electrode and fluid in the fluid-conducting channel of the at least one nozzle causes an ion to leave the at least one nozzle without needing to apply a voltage bias to another extracting electrode in order to cause this dispensing of the ion.

20. A fluid-dispensing device, comprising:

a substrate;

a nozzle formed in the substrate, the nozzle having an open-ended tip and a fluid-conducting channel between the tip and a source of fluid;

a non-conducting spacer on the substrate; and an integrated gate electrode electrically isolated from the substrate by the non-conducting spacer, the gate electrode being located within approximately three microns of the tip of the nozzle to cause fluid in the fluid-conducting channel of the nozzle to be dispensed in response to a voltage applied to the integrated gate electrode.

21. The device of claim 20, wherein the nozzle is one of electrically non-conductive and electrically conductive.

22. The device of claim 20, wherein the dispensed fluid is comprised of one of a droplet and a stream.

23. The device of claim 20, wherein the gate electrode does not collect any of the dispensed fluid.

24. The device of claim 20, further comprising a conductor in electrical communication with the fluid in the nozzle.

25. The device of claim 20, further comprising a fluid-containing reservoir connected to the channel of the nozzle for providing fluid to the channel.

26. The device of claim 20, wherein a magnitude of the applied voltage is less than approximately 200 volts.

27. The device of claim 20, wherein the gate electrode is spatially located within approximately one micron of the nozzle.

28. The device of claim 20, wherein the applied voltage comprises a pulse.

29. The device of claim 20, wherein the applied voltage comprises a sequence of pulses at a pulse frequency and duty cycle.

30. The device of claim 20, wherein the source of fluid is self-contained within the device after the device is fabricated.

31. The device of claim 20, wherein the source of fluid is external to the device.

32. The device of claim 20, wherein the fluid is one of electrically non-conductive and electrically conductive.

33. The device of claim 20, wherein the device is micro-fabricated.

34. The device of claim 20, further comprising a voltage supply providing the voltage applied to the gate electrode.

35. The device of claim 20, wherein the dispensed fluid is comprised of one of an organic liquid, an inorganic liquid, and a combination of organic and inorganic liquids.

36. An apparatus, comprising:

a source of fluid;

a voltage source; and a fluid-dispensing device micro-fabricated on a substrate, the fluid-dispensing device having a nozzle and an integrated gate electrode that is electrically isolated from the substrate, the nozzle having an open-ended tip and a fluid-conducting channel between the tip and the source of fluid, the channel obtaining fluid from the source of fluid, the integrated gate electrode being located in such proximity of the tip of the nozzle that applying a voltage difference of sufficient magnitude between the gate electrode and fluid in the fluid-conducting channel of the nozzle causes fluid to be dispensed from the fluid-conducting channel of the nozzle without needing to apply a voltage bias to another extracting electrode in order to cause this dispensing of the fluid.

37. The apparatus of claim 36, further comprising a receiving electrode biased with a voltage and positioned opposite the nozzle to attract and receive the dispensed fluid.

38. The apparatus of claim 37, wherein the bias voltage applied to the receiving electrode is at least equal in magnitude to the voltage difference applied between the gate electrode and the fluid.

39. The apparatus of claim 36, further comprising means for controlling evaporation of the fluid dispensed from the fluid-dispensing device.

40. A method for mixing fluids using a fluid-dispensing device having a plurality of nozzles and a plurality of individually addressable gate electrodes, each nozzle having an open-ended tip and a fluid-conducting channel between the tip and a source of fluid, each individually addressable gate electrode being located adjacent to the tip of at least one of the plurality of nozzles to effect dispensing of fluid from that tip when a voltage is applied to that individually addressable gate electrode, the method comprising:

aligning a receptacle with the fluid-dispensing device to receive fluid dispensed from a first and second nozzles of the plurality of nozzles;

applying a first voltage to a first individually addressable gate electrode to effect dispensing a first fluid at a first flow rate from the first nozzle into the receptacle; and applying a second voltage to a second individually addressable gate electrode to effect dispensing a second fluid at a second flow rate from the second nozzle into the receptacle such that the second fluid mixes with the first fluid.

41. The method of claim 40, wherein the first flow rate is different than the second flow rate.

42. The method of claim 40, wherein a magnitude of the first applied voltage differs from a magnitude of the second applied voltage.

43. The method of claim 40, wherein the steps of applying the first voltage to the first individually addressable gate electrode and applying the second voltage to the second individually addressable gate electrode occur simultaneously.

44. The method of claim 40, wherein the steps of applying the first voltage to the first individually addressable gate electrode and applying the second voltage to the second individually addressable gate electrode occur sequentially.

45. The method of claim 40, further comprising pulsing at a pulse frequency and duty cycle the first voltage applied to the first individually addressable gate electrode to achieve the first flow rate.

46. The method of claim 40, further comprising adjusting the magnitude of the first voltage applied to the first individually addressable gate electrode to achieve the first flow rate.

47. The method of claim 40, further comprising selecting the first and second individually addressable gate electrodes for applying voltage thereto.

48. The method of claim 40, further comprising aligning a second receptacle with the fluid-dispensing device to receive fluid dispensed from a third nozzle of the plurality of nozzles and applying a third voltage to a third individually addressable gate electrode to effect dispensing a third fluid at a third flow rate from the third nozzle into the second receptacle.

49. A method of dispensing fluid by a fluid-dispensing device having a plurality of nozzles and a plurality of individually addressable integrated gate electrodes, each nozzle having an open-ended tip and a fluid-conducting channel between the tip and a source of fluid, the method comprising:

providing each individually addressable gate electrode in such proximity of the tip of at least one of the plurality of nozzles that applying a voltage difference of sufficient magnitude between that individually addressable gate electrode and fluid in the fluid-conducting channel of the at least one of the plurality of nozzles causes the fluid to be dispensed from that tip without needing to apply a voltage bias to another extracting electrode in order to cause this dispensing of the fluid;

selecting one of the individually addressable gate electrodes for applying a voltage thereto; and applying a voltage difference of sufficient magnitude between the selected individually addressable gate electrode and the fluid in the fluid-conducting channel of at least one of the nozzles to cause fluid to be dispensed from the at least one of the nozzles while other nozzles of the fluid-dispensing device remain inactivated.

50. The method of claim 49, further comprising selecting a plurality of individually addressable gate electrodes for applying a voltage thereto and for causing the dispensing of fluid from at least one of the nozzles, the nozzles that are induced to dispense fluid being located at particular positions on the fluid-dispensing device to form a pattern with the dispensed fluid.

51. The method of claim 50, wherein the pattern is an alphanumeric character.

52. The method of claim 49, further comprising pulsing the applied voltage at a pulse frequency to achieve a flow rate.

53. The method of claim 49, further comprising varying the pulse frequency to vary the flow rate.

54. The method of claim 49, further comprising varying a duty cycle of the pulsing to vary the flow rate.

55. The method of claim 49, further comprising adjusting a magnitude of the applied voltage difference to achieve a flow rate.

56. A fluid-dispensing device, comprising:

a substrate;

a plurality of nozzles formed in the substrate, each nozzle having an open-ended tip and a fluid-conducting channel between the tip and a source of fluid;

a non-conducting spacer on the substrate; and an integrated gate electrode electrically isolated from the substrate by the non-conducting spacer, the gate electrode being located in such proximity of the tip of a nozzle of the plurality of nozzles that applying a voltage difference of less than approximately 200 volts between the integrated gate electrode and fluid in the fluid-conducting channel of that nozzle is sufficient to extract fluid from that nozzle.

57. The device of claim 56, wherein the nozzle is one of electrically non-conductive and electrically conductive.

58. The device of claim 56, wherein the dispensed fluid is comprised of one of a droplet and a stream.

59. The device of claim 56, further comprising a conductor in electrical communication with the fluid in the nozzle.

60. The device of claim 56, further comprising a fluid-containing reservoir connected to the channel of the nozzle for providing fluid to the channel.

61. The device of claim 56, wherein the gate electrode is spatially located within approximately three microns or less of the nozzle.

62. The device of claim 56, wherein the applied voltage difference comprises a pulse.

63. The device of claim 56, wherein the applied voltage difference comprises a sequence of pulses at a pulse frequency and duty cycle.

64. The device of claim 56, wherein the source of fluid is self-contained within the device after the device is fabricated.

65. The device of claim 56, wherein the source of fluid is external to the device.

66. The device of claim 56, wherein the fluid is one of electrically non-conductive and electrically conductive.

67. The device of claim 56, wherein the device is microfabricated.

68. The device of claim 56, wherein the dispensed fluid is comprised of one of an organic liquid, an inorganic liquid, and a combination of organic and inorganic liquids.

* * * * *